(12) United States Patent
Agrawal et al.

(10) Patent No.: US 12,705,215 B2
(45) Date of Patent: Aug. 11, 2026

(54) HYBRID DATA-COMPUTE PLATFORM

(71) Applicant: ROYAL BANK OF CANADA, Toronto (CA)

(72) Inventors: Manoj Agrawal, Toronto (CA); Gunjan Modha, Toronto (CA)

( * ) Notice: Subject to any disclaimer, the term of this patent is extended or adjusted under 35 U.S.C. 154(b) by 128 days.

(21) Appl. No.: 18/374,977

(22) Filed: Sep. 29, 2023

(65) Prior Publication Data

US 2024/0111734 A1 Apr. 4, 2024

Related U.S. Application Data

(60) Provisional application No. 63/411,790, filed on Sep. 30, 2022.

(51) Int. Cl.
*G06F 16/21* (2019.01)
*G06F 16/2455* (2019.01)

(52) U.S. Cl.
CPC ...... *G06F 16/211* (2019.01); *G06F 16/24564* (2019.01)

(58) Field of Classification Search
CPC ......................... G06F 16/211; G06F 16/24564
See application file for complete search history.

(56) References Cited

U.S. PATENT DOCUMENTS 9,398,087 B1 * 7/2016 Hosie ........................ G06F 8/60
9,824,106 B1 * 11/2017 Rongali .............. G06F 16/2456
10,977,267 B1 * 4/2021 O'Connor ............. G06F 16/252
11,893,028 B2 * 2/2024 Pellerin ................. G06F 16/252
12,079,352 B2 * 9/2024 Apostolatos .......... G06F 16/258
12,169,502 B1 * 12/2024 Abraham .............. G06F 16/258
12,411,816 B2 * 9/2025 Chatterjee ............ G06F 16/211
2011/0289588 A1 * 11/2011 Sahai ..................... G06Q 90/00 726/25
2013/0080642 A1 * 3/2013 Adam ................ G06F 11/3495 709/226
2015/0033305 A1 * 1/2015 Shear .................. G06F 21/6245 726/11
2015/0281401 A1 * 10/2015 Le .......................... G06F 9/547 709/203
2017/0099362 A1 * 4/2017 Almond .................. H04L 63/08
2017/0257429 A1 * 9/2017 Hosie .................... H04L 67/101
2017/0286485 A1 * 10/2017 Chandramouli ...... G06F 16/245
2017/0371718 A1 * 12/2017 Ko ........................ G06F 9/5044
2018/0082072 A1 * 3/2018 Hosie ................. G06F 21/6218
2018/0227369 A1 * 8/2018 DuCray ................. G16H 40/20
2019/0045008 A1 * 2/2019 Murthy ................. G06F 16/212
2021/0209077 A1 * 7/2021 Snellman ............... G06F 9/541
2021/0224238 A1 * 7/2021 Orsini ..................... G06F 40/20
2021/0234860 A1 * 7/2021 Bansal .................... H04L 67/51
2021/0392142 A1 * 12/2021 Stephens ............... H04L 63/104
2022/0050921 A1 * 2/2022 LaFever ................. G16H 10/60
2022/0165375 A1 * 5/2022 French, Sr. ............ G16H 40/20
2022/0407889 A1 * 12/2022 Narigapalli ........... H04L 63/101
2023/0195515 A1 * 6/2023 Zhang .................. G06F 9/4881 718/102
2023/0205917 A1 * 6/2023 Chalk .................. G06F 21/602 726/30
2023/0229640 A1 * 7/2023 Peng ..................... G06F 16/256 706/12

(Continued)

*Primary Examiner* — Mark E Hershley

(57) ABSTRACT

A hybrid computer architecture a process providing flexible computing resources across a combination of on-premise computing resources and cloud-based computing resources.

17 Claims, 7 Drawing Sheets

(56) References Cited

U.S. PATENT DOCUMENTS

2023/0259406 A1* 8/2023 Guan .................... G06F 9/5083 718/104
2024/0020282 A1* 1/2024 De Freitas Cunha ....................... G06F 16/258
2024/0095600 A1* 3/2024 Gonzalez Sanchez ...................... G06N 3/088
2024/0296157 A1* 9/2024 Kurian ................ G06F 16/2379
2024/0361736 A1* 10/2024 Brown ................... G16H 40/20

* cited by examiner

HYBRID DATA-COMPUTE PLATFORM

RELATED APPLICATIONS

The current application claims priority to U.S. Provisional application 63/411,790 titled "Hybrid Data-Compute Platform," filed Sep. 30, 2022, the entire contents of which are incorporated herein by reference in their entirety for all purposes.

TECHNICAL FIELD

The current disclosure relates to a computing architecture providing flexible data and compute resources and in particular to a hybrid computing architecture using both on-premise resources and cloud-based resources.

BACKGROUND

The increasing use of data science models, machine learning and artificial intelligence puts increasing demands on computing resources. Additionally, the needed computing resources may change over time, and possibly quickly, and in unpredictable ways. In order to handle these computing demands, it is possible to have all computing done on premise, however this can lead to excess computing resources being unused during times of lower computing demands. Alternatively, computing may be performed on a cloud based compute platform such a Microsoft® Azure® or Amazon Web Services (AWS®). However, deploying applications onto cloud resources may require each application to individually address concerns with deploying applications to the cloud such as data security, location requirements, costs, etc.

A more flexible computing architecture for addressing a business's varying computing demands is desirable.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
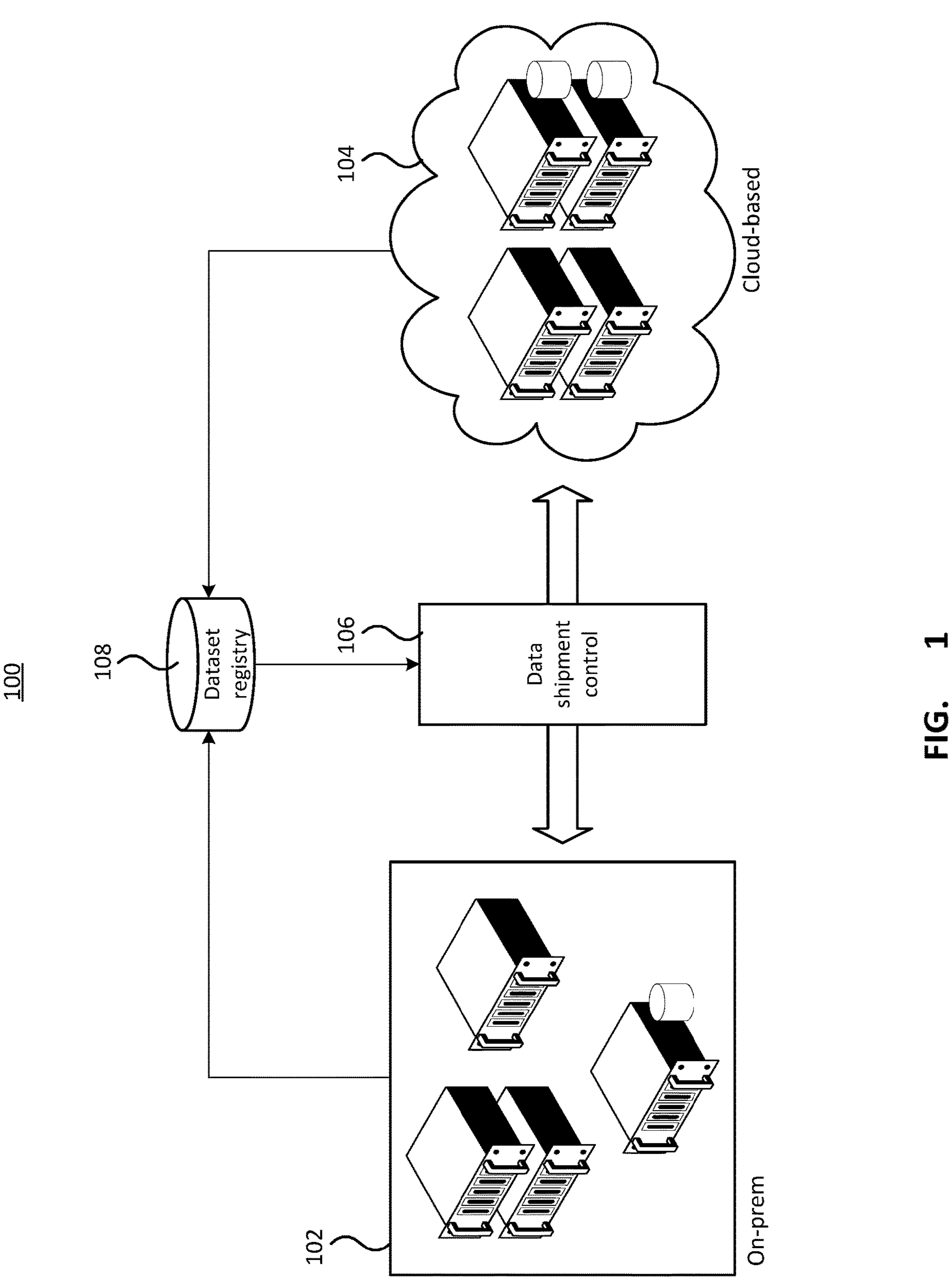
FIG. 1 depicts a hybrid data compute plane.

In accordance with the present disclosure there is provided a method of executing a process comprising: registering a dataset schema with a data shipment registry, registering the dataset schema including associating one or more data shipment rules with the dataset schema; registering the process with the data shipment registry including associating one or more processing rules with the process; receiving a job request for the process specifying at least one dataset and retrieving the processing rules associated with the process and data shipment rules registered in association with the at least one dataset; determining an execution location of the process based on the retrieved processing rules and the data shipment rules, the determined execution location selected from an on-premise processing location and a cloud-based processing location; transferring, according to the data shipment rules, at least one of: an input dataset to the determined execution location; and an output dataset from the determined execution location; executing the process at the determined execution location including at least one of: using the input dataset transferred to the determined execution location; and generating the output dataset transferred from the determined execution location.

In a further embodiment of the method, the processing location is further determined based on one or more of: desired performance requirements of the process; resource constraints of the on-premise location; and costs associated with executing the process at the cloud-based location.

In a further embodiment of the method, the data shipment rules specify one or more of: allowed storage locations of the associated dataset; encryption requirements for transferring the dataset; and encryption of one or more portions of the dataset.

In a further embodiment of the method, transferring the at least one of the input dataset and the output dataset of the process comprises bulk transferring or streaming the at least one of the input dataset and the output dataset.

In a further embodiment of the method, transferring the at least one of the input dataset and the output dataset comprises scanning the dataset for personally identifiable information (PII).

In a further embodiment of the method, transferring the at least one of the input dataset and the output dataset further comprises modifying the PII in the at least one of the input dataset and the output dataset.

In a further embodiment of the method, modifying the PII comprises one or more of: removing the PII from the at least one of the input dataset and the output dataset; replacing the PII in the at least one of the input dataset and the output dataset with non-identifiable information; and encrypting the PII in the at least one of the input dataset and the output dataset.

In a further embodiment of the method, data shipment rules associated with the at least one of the input dataset and the output dataset specify requirements for modifying PII.

In a further embodiment of the method, the data shipment rules define data security policies for the associated dataset.

In a further embodiment of the method, transferring the at least one of the input dataset and the output dataset comprises sending a notification of the transfer to an operational store for tracking locations of datasets.

In accordance with the present disclosure there is further provided a system for executing a process, the system comprises: at least one processor for executing instructions; and at least one memory storing instructions, which when executed by the at least one processor configures the system to perform a method comprising: registering a dataset schema with a data shipment registry, registering the dataset schema including associating one or more data shipment rules with the dataset schema; registering the process with the data shipment registry including associating one or more processing rules with the process; receiving a job request for the process specifying at least one dataset and retrieving the processing rules associated with the process and data shipment rules registered in association with the at least one dataset; determining an execution location of the process based on the retrieved processing rules and the data shipment rules, the determined execution location selected from an on-premise processing location and a cloud-based processing location; transferring, according to the data shipment rules, at least one of: an input dataset to the determined execution location; and an output dataset from the determined execution location; executing the process at the determined execution location including at least one of: using the input dataset transferred to the determined execution location; and generating the output dataset transferred from the determined execution location.

In a further embodiment of the system, the processing location is further determined based on one or more of: desired performance requirements of the process; resource constraints of the on-premise location; and costs associated with executing the process at the cloud-based location.

In a further embodiment of the system, the data shipment rules specify one or more of: allowed storage locations of the associated dataset; encryption requirements for transferring the dataset; and encryption of one or more portions of the dataset.

In a further embodiment of the system, transferring the at least one of the input dataset and the output dataset of the process comprises bulk transferring or streaming the at least one of the input dataset and the output dataset.

In a further embodiment of the system, transferring the at least one of the input dataset and the output dataset comprises scanning the dataset for personally identifiable information (PII).

In a further embodiment of the system, transferring the at least one of the input dataset and the output dataset further comprises modifying the PII in the at least one of the input dataset and the output dataset.

In a further embodiment of the system, modifying the PII comprises one or more of: removing the PII from the at least one of the input dataset and the output dataset; replacing the PII in the at least one of the input dataset and the output dataset with non-identifiable information; and encrypting the PII in the at least one of the input dataset and the output dataset.

In a further embodiment of the system, data shipment rules associated with the at least one of the input dataset and the output dataset specify requirements for modifying PII.

In a further embodiment of the system, the data shipment rules define data security policies for the associated dataset.

In a further embodiment of the system, transferring the at least one of the input dataset and the output dataset comprises sending a notification of the transfer to an operational store for tracking locations of datasets.

In accordance with the present disclosure there is further provided a non-transitory computer readable memory storing instructions, which when executed by at least one processor of a system configures the system to perform a method according to the methods described above.

A flexible computing architecture is described further below which provides flexible data and compute resources that can scale easily to meet processing demands while ensuring data is securely handled in accordance with requirements of the data. The hybrid data compute plane architecture described herein enables on-demand compute scaling across an entity's internal data centers and public cloud infrastructure using containers and traditional computing patterns. The architecture described herein allows the computing resources to be scaled easily across both on-premise compute resources and cloud-based compute resource while also providing secure data shipment, or transfer, across the compute resources whether on-premise or in the cloud. The transfer of data may be done using batch, micro-batch as well as streaming methods while ensuring that the data being transferred is transferred in accordance with one or more rules or policies. Additionally, the computing architecture described herein can provide end-to-end data tracking, auditing, policies compliance, centralized metadata management, federated queries and integration with key storage technologies.

As data and computing demands continue to grow, entities such as businesses, enterprises, universities, governments etc. could benefit from a computing architecture that allows data security requirements to be easily maintained and enforced and processing requirements to be defined in a flexible manner that allows securely scaling of the data and compute requirements across both the entities' internal or private computing resources and cloud-based resources. The computing architecture allows for data and computing resources to be scaled in a cost effective manner to meet changing compute demands. The hybrid data and compute plane architecture described herein may also be used both by entities that wish to maintain their own internal or private computing resources while using cloud-based resources to meet additional demands. Additionally or alternatively, the computing architecture may be used by entities as they transition a traditionally internal or private computing resources to cloud based resources.

The hybrid data compute plane computing architecture may provide improved efficiencies, with regard to both elasticity and scalability, with compute abstraction across both on-premise and cloud-based resources. By providing a computing architecture that can easily distribute jobs across both on-prem and cloud-based resources it is possible to provide improved redundancy, with regard to both high availability and disaster recovery with multi-cloud integration allowing jobs to be run on multiple different $3^{rd}$ party cloud providers. The computing architecture provides the ability for business to quickly react to changing market conditions, while reducing risks of business and regulatory SLA breaches and reducing operational cost. The computing architecture can provide a standardized and consistent permission model across both on-prem and cloud-based computing resources which can improve data security. The standardized data security across both on-prem and cloud-based resources can improve policy compliance by providing policy enforcement across all data and compute resources regardless of whether they are located on-prem or in the cloud.

FIG. 1 depicts a hybrid data compute plane. The hybrid data compute plane architecture 100 allows applications, or portions of applications to be executed both on on-premise computing resources 102 and cloud-based computing resources 104. Although described as being on-premise, the computing resources 102 do not need to be physically located at a companies' physical location and may be located at one or more locations. The on-prem computing devices 102 may be controlled by the business. The on-prem computing may be used for various different computing tasks required by the company but may be suited for providing business critical tasks and sensitive data. The on-prem computing resources may execute traditional applications as well as containerized applications that have been designed for execution on cloud based. The cloud-based computing resources may be provided by one or more $3^{rd}$ party cloud infrastructure providers. The cloud-based computing resources 104 provide the ability to programmatically control the computing resources available and deploying applications to the cloud-based resources for execution.

The cloud-based computing resources 104 provide flexibility to a company for deploying compute resources as needed, for example, adding additional compute resources temporarily while a new process is executed, such as training or retraining a machine learning model. While cloud-based compute resources provide flexibility, the use of cloud-based computing results in reduced control of the computing resources, including the data, as the resources are no longer fully in control of the company. While making use of cloud-based compute resources easier within a company may be useful, it may also make it more difficult for the company to adhere to data and compute policies, procedures and compliance requirements.

In order to simplify the adherence to data and compute policies, procedures and compliance requirements and facilitate the use of cloud-based compute resources, data shipment control functionality 106 is provided to control the transfer of data between the different processing locations. The data shipment control functionality 106 ensures that any datasets transferred between processing locations comply with any data policies such as encryption requirements, storage requirements, locality requirements, etc. The data shipment rules enforced by the data shipment control functionality 106 is stored in a dataset registry 108. The shipment rules stored in the dataset registry are stored in the registry when datasets are registered. The data shipment control functionality 106 may prevent datasets that have not been registered in the registry 108 from being transferred, for example to the cloud-based resources.

The hybrid data compute plane architecture enables applications to run on premise and leverage public cloud for burst compute in a cost effective manner as well as enabling additional opportunities for leveraging cloud-based resources for non-production activities, such as data science, disaster recovery, testing etc.

Figure 2:
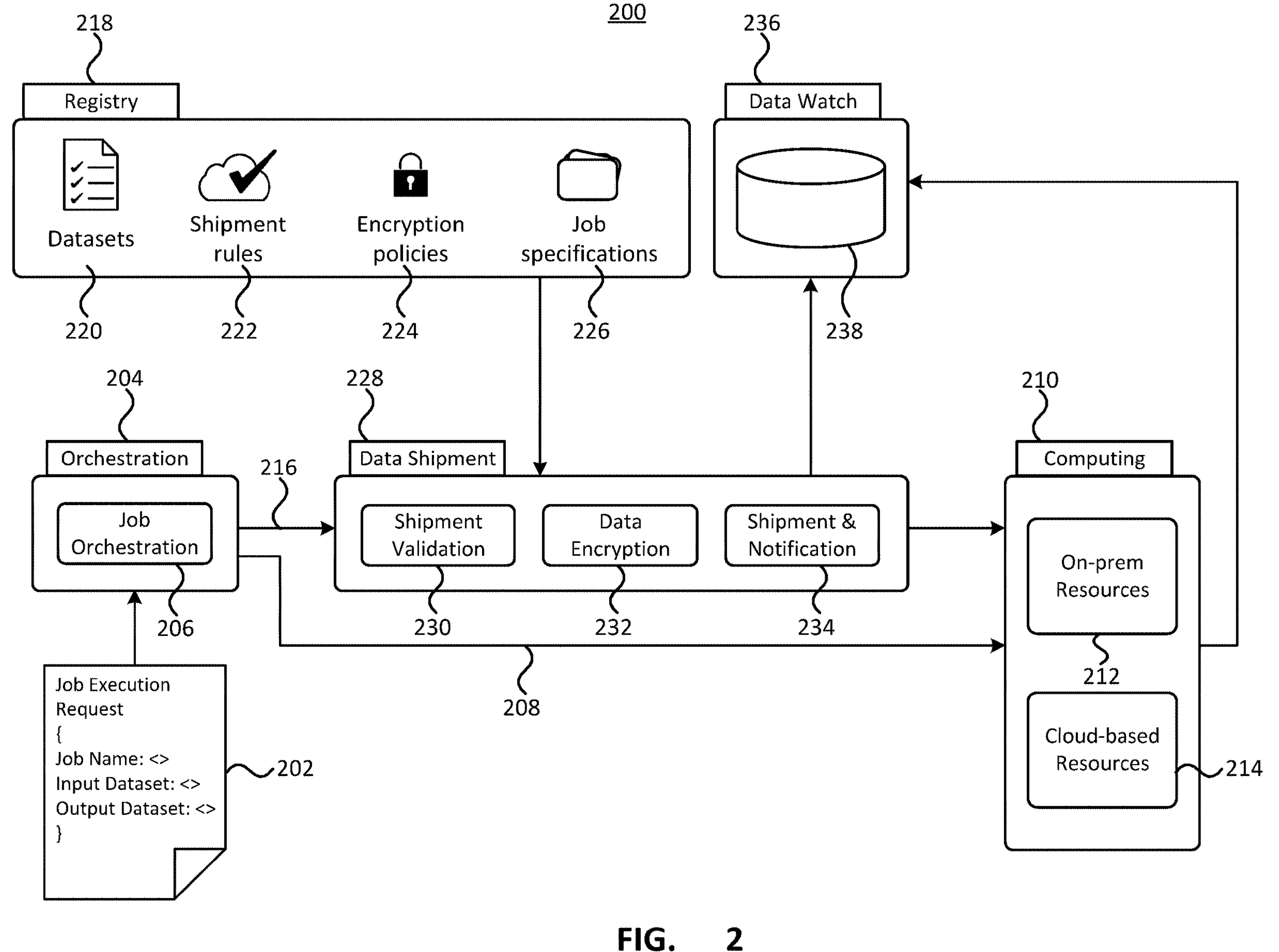
FIG. 2 depicts details of the hybrid data compute plane.

FIG. 2 depicts details of the hybrid data compute plane. Although not depicted in FIG. 2, the functionality depicted in FIG. 2 is implemented on a computing device comprising a processor that executes instructions stored in a memory. The computing resources used to implement the functionality depicted in FIG. 2 may be on-prem resources or cloud-based resources. Applications that are executed on the hybrid data compute plane may be designed with clear well defined resource requirements in order to provide the right sizing of compute and storage costs when executed.

When executing an application or task, a job execution request 202 is received or provided to an orchestration component 204 providing job orchestration functionality 206. The job execution request may include a job name as well as one or more input datasets and output datasets provided by job. The job name may correspond to a particular job that can be executed on either on-prem compute resources or cloud-based compute resources. The job orchestration functionality 206 provides the data processing request 208 to computing resources 210. The job orchestration functionality may determine whether to perform the job using the on-prem resources 212 or cloud-based compute resources 214. The job orchestration functionality may also coordinate the data shipment process of the datasets.

The data shipment 228 provides a process to ensure that data is handled according to shipment and encryption policies. The data shipment job may include shipment validation functionality 230 that validates shipment rules, data encryption functionality 232 that applies data encryption policies to the datasets and shipment and notification functionality 234 that can initiate data transfers for processing and/or storage.

The hybrid data compute plane architecture includes a registry 218 that allows jobs and datasets and their associated handling rules to be specified. The registry stores information about datasets 220, data shipment rules 222, encryption policies 224 and job specifications. Data watch 236 functionality may provide a data store such as a database 238 that stores notifications about the datasets and jobs. The data watch may be used to provide insight into where data is located and provide data for auditing.

The registry 218 may provide a metadata store that is a centralized store for all meta data related to data and compute needs including dataset schema, ownership, classification, lifecycle rules, shipment profile, location, data security profile, data consumption profile and compute profile including support for on premise and public cloud providers.

The data shipment 228 provides secured data shipment pipeline supporting batch, micro-batch and streaming data shipment patterns. Data shipment to/from target locations is controlled via the configuration stored in the metadata registry.

The hybrid data compute plane architecture may include a data lifecycle manager for a configuration-driven data lifecycle management including backup, archiving, restore across on premise and multiple cloud providers. The hybrid data compute plane architecture may also provide support and integration for structured, semi-structured and unstructured data types across object stores, block stores, cache, SQL, graph and other no-SQL databases. The hybrid architecture may provide a policy manager that has integration with enterprise control plane, data/compute pipelines, policies and enforcing policy compliance.

A compute controller may provide a cost aware compute scaler that can scale containerized workloads across on premise and public clouds.

The hybrid data compute plane architecture described herein may be particularly useful with applications and datasets that are designed for the architecture. All datasets need to be registered so that appropriate data shipment rules can be applied. Structured data may be registered in association with a well-defined schema. Registered structured datasets should be correctly classified and underlying data should match the schema. Any data shipment to cloud resources are requested and approved by the data steward and relevant stakeholders which can be specified in a registration workflow defining a shipment approval workflow. The datasets may also comprise unstructured and/or semi-structured data. The data shipment rules may specify one or more rules or requirements for the shipment of the unstructured/semi-structured data. Data may be encrypted both in motion and at rest. Datasets with sensitive fields or content may need to be encrypted using enterprise recommended on-premise encryption technology which can be defined in the shipment rules when registering the dataset.

Although not required, applications should be cloud agnostic, containerized into smaller services and may follow the twelve factor app methodology for building SaaS applications. Deployments should separate compute and storage in order to scale out the compute and storage resources independently and maintain lower overall costs. Applications should have clear well defined resource requirements in order to ensure right sizing of compute and storage costs. Data access may be location agnostic and can be accessed seamlessly across on-premise data store and in cloud resources. Security and entitlement policies may be well defined and consistent across on-premise and different cloud environments. Confidential and sensitive data and workloads can be restricted to on-premise data center and cannot be shipped outside of the internal domain. Data and compute can follow the prescribed governance and compliance requirements.

In FIG. 2, a data shipment request is triggered by a client. The client triggers a shipment job with the input & output dataset details. The shipment process retrieves the shipment rules registered in association with the input/output datasets. The shipment job triggered by the client validates the shipment rules, applies encryption policies defined in association with the dataset and initiates the data transfer. For structured datasets the associated schema allows the data to be validated before shipment, with each known attribute pre-approved and in compliance with policies for shipment. For example, certain attributes of the structured data may need to be masked or redacted or otherwise modified prior to shipment to the cloud. Similarly, for unstructured data, the shipment rules may specify requirements of the data such as having a license to the data, the data being shareable, a time to live on the cloud, encryption requirements, etc.

When encrypting datasets, the dataset as a whole may be encrypted for transfer prior to shipment. Additionally, one or more portions or fields of the datasets, particularly for structured or semi-structured datasets, such personally identifiable information, may be separately encrypted. The field level encryption may be done using deterministic field preserving encryption techniques. The field level encryption applied on-prem may prevent decryption of the fields at the cloud-based resources. The data transfer and shipment notifications may be fed into the operation store. The data processing job may also be triggered by the client and the processing job executed either on prem or on cloud-based resources. Process and data notifications may be streamed or sent to the data watch.

Figure 3:
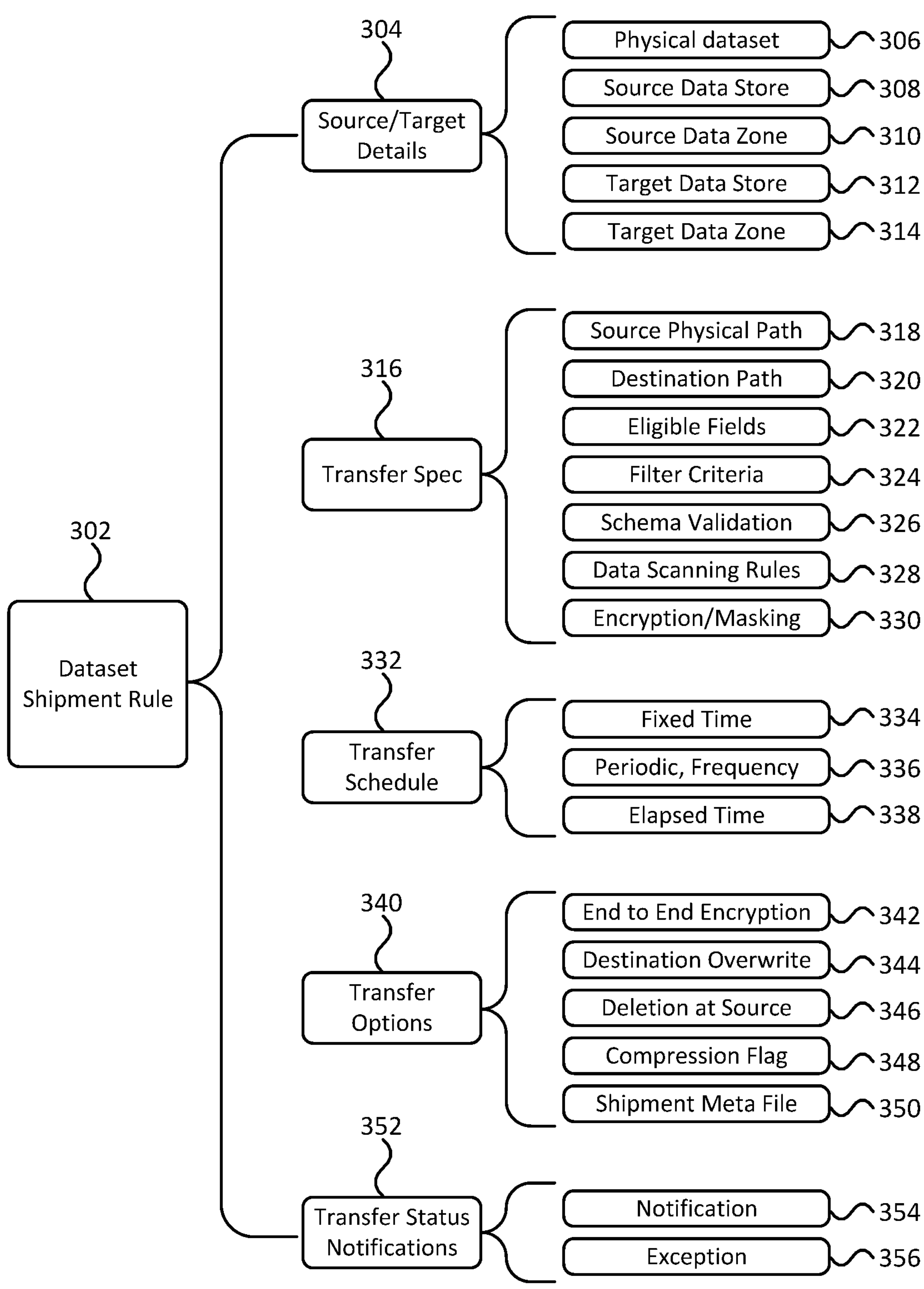
FIG. 3 depicts details of a data shipment rule.

FIG. 3 depicts details of a data shipment rule. A data shipment rule 302 may be associated with a particular dataset during the registration process. The data shipment rule 302 may include various groupings or types of rules or parameters, including for example, source and target details 304, transfer specifications 316, transfer schedule 332, transfer options 340 and transfer status notifications 352. It will be appreciated that the groupings depicted in FIG. 3 are only illustrative and various different groupings, or possibly no groupings, may be used in specifying shipment rules.

The rules may specify the physical dataset 306 which specifies the actual dataset represented by the physical dataset; the source data store 308 and data zone 310. Similarly the rule may specify the target data store 312 and target data zone 314. The data store 308, 312 specifying a datastore such as on-prem, HDFS (Hadoop Distributed File System), S3 and the data zone 310, 314 specifies a specific zone within the data store.

The transfer specification 316 may include directory path and or table data on a source physical path 318 of the source dataset as well as for the destination path 320. Eligible fields 322 for shipment may be specified along with one or more filter criteria 322 such as file path prefix, partitions, etc. Schema validation 326 information may specify dataset schemas to be used in validation of the dataset prior to shipment. The rule may also provide data scanning rules 328 specifying one or more rules for scanning the dataset for particular information such as personally identifiable information. Encryption/masking 330 may include encryption and or masking policies to be applied to the dataset prior to shipment.

The shipment rule 302 may also include information on a transfer schedule 332 that may include information about a one time fixed transfer 334 possibly at a specific time. The transfer schedule may also specify a periodic transfer 336 schedule which could be specified with a start time, end time and frequency, although other manners of specifying the periodic transfer may be used. Additionally or alternatively, the transfer schedule could be specified as an elapsed time 338 specifying a transfer after an elapsed time since last modification and previous shipment of the dataset.

The shipment rule 302 may also include information on transfer options 340 such as end to end encryption 342 to apply to the transfer, destination overwrite 344 specifying data overwrite rules at the destination, deletion at source 346 information specifying a source data deletion indicator, a compression flag 348 may indicate whether to apply compression to the dataset prior to transfer as well as a shipment meta file 350 which may indicate whether to generate a meta file with details of the file set/dataset that is transferred.

The shipment rule 302 may also include information on transfer status notifications 352 including information about notifications 354 for the shipment process such as indicating that the transfer has started or finished as well as possible exceptions 356 such as any exceptions or warnings encountered.

Figure 4:
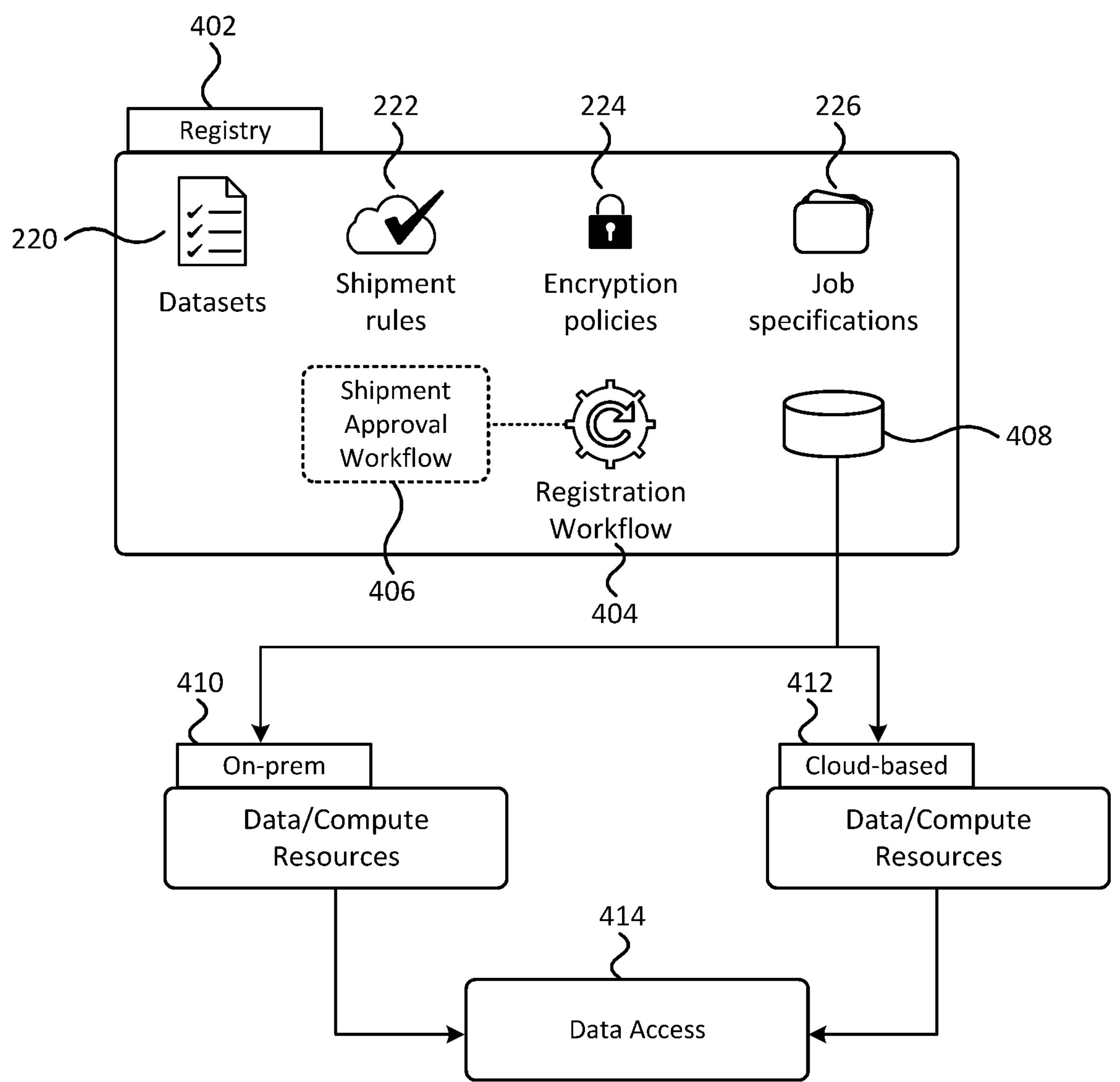
FIG. 4 depicts further details of the hybrid data compute plane.

FIG. 4 depicts further details of the hybrid data compute plane. FIG. 4 depicts a registry 402 that allows datasets to be registered with the hybrid data compute plane architecture. The registry may include datasets 220 that defines schema, categorization physical location, etc; associated shipment rules 222 that define cloud store location, transfer mechanism, transfer specs and frequency; encryption policies 224 that define encryption policies for on prem datasets and/or cloud datasets; and job specifications 226 that defines data processing hobs and the platforms, such as on-premise or on a particular 3rd party cloud infrastructure. The registry may also provide a registration workflow 404 that uses a shipment approval workflow 406 when a dataset is being registered with the system. The registration workflow can trigger the data registration workflow for data steward approval, registers information with enterprise tools and creates physical dataset pointing to cloud stores. The registry information may be stored in a data store 408 and used by both on-prem data compute resources 410 and cloud-based data/compute resources 412. The shipment rules and encryption policies as well as the shipment approval workflow for registration may be used by data access functionality 414 when transferring data between on-prem and cloud-based resources.

The data registry 402 can provide the central metadata store of various datasets. The data registry can include definitions of data schemas, data classification, encryptions policies, physical locations and provide standardized access to data. The registry supports configuration of data processing/data shipment jobs that are orchestrated using common orchestration framework.

Figure 5:
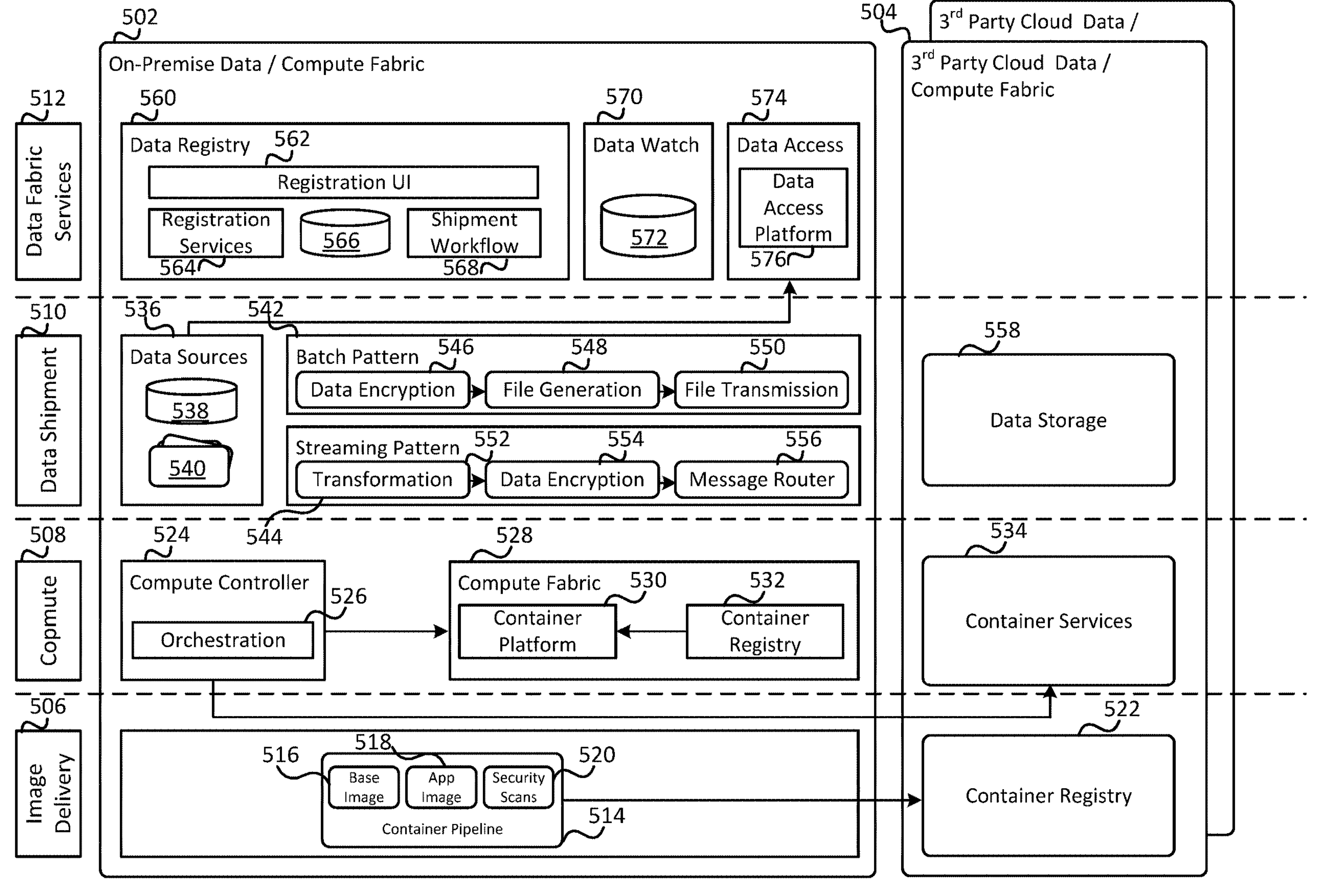
FIG. 5 depicts further details of the hybrid data compute plane.

FIG. 5 depicts further details of the hybrid data compute plane. As depicted, various different services and functionality can be implemented on computing resources, including the on-premise data compute fabric 502 and $3^{rd}$ part cloud data compute fabric 504. The services and functionality are depicted as being grouped into image delivery functionality 506, compute functionality 508, data shipment functionality 510, and data fabric services 512; however similar functionality may be provided in other arrangements.

The image delivery functionality may include a container pipeline 514 that can store and provide base images 516 and application images 518 for execution to compute resources. Security scan functionality 520 may be included to scan images for security threats. The images may be provided to a container registry 522 on one or more cloud infrastructures for execution. The images may also be provided to a container registry of the on-prem compute resources.

The compute functionality 508 may include a compute controller 524 that provides job orchestration functionality 526. The compute controller 524 schedules jobs, including data shipment jobs and application processing jobs, for performing either on the compute fabric 528 of the on-prem resources which includes a container execution platform functionality 530 as well as container registry functionality 532 and container services 534 on the $3^{rd}$ party cloud resources.

Data shipment functionality 510 may include one or more data sources 536 such as databases 538, NAS stores 540, or other data sources which may provide structured and/or unstructured data. The data shipment functionality 510 may provide batch pattern shipment functionality 542 and/or streaming functionality 544 that transmits the datasets according to the shipment rules. The batch pattern may include data encryption functionality 546, file generation functionality 548 for generating the dataset and file transmission functionality 550 for transferring the generated file. The streaming functionality 552 includes transformation functionality for transforming the dataset into a suitable streaming format, data encryption functionality 554 and streaming functionality which may comprise, for example, message router functionality 556 that streams the encrypted data. The $3^{rd}$ party cloud resources may provide data storage functionality 558 which may include similar data shipment functionality, although not depicted. The functionality may also scan generated or modified datasets for personally identifiable data in accordance with the data shipment rules registered in association with the dataset. When a new dataset is created that is not already registered, the dataset may be registered which may require intervention from one or more data stewards according to a data registration workflow.

Data fabric services 512 executing on the on-prem resources can include data registration functionality 560. The data registration may include a registration user interface 562 that allows a user to specify the various information for a registration service. The dataset registration information may be stored in a database 566 for access by the data shipment functionality 510, as well as the compute functionality. Shipment workflow functionality provides a workflow for the data shipment. A data watch 570 may store notification information about datasets and their transfer in a datastore 572. Data access functionality 574 may provide a data access platform 576 that allows the transfer of datasets according to the data shipment rules registered in association with the datasets using the data shipment processes.

The hybrid data compute plane architecture has various benefits, including with regard to resource optimization and cost savings. The architecture may reduce on-premise data center foot print and optimize money spent by leveraging cloud resources. Workloads can be run in a cost effective manner across internal data center resources and public cloud-based resources. The architecture may also be used to improve business continuity by providing a simplified mechanism for disaster recovery and backup management in support of business continuity. The operational efficiency may be improved with the architecture by extending existing operation stack and automating existing operational processes with a cloud operating model. A cloud native patch management may be adopted to reduce operational cost and risks associated with on-going maintenance of servers and security updates.

Flexibility and scalability may be improved with the hybrid architecture which provides the ability to scale up/down automatically to changing business needs. New test and/or development environments can be quickly and easily spun up with ease. The architecture can optimize for performance and efficiency using public cloud compute and storage resources. The architecture provides for agility by being able to quickly choose optimal computing environment and reduced time to market for new business or regulatory initiatives. The architecture allows workloads to be seamlessly moved across on-premise resources and cloud based resources as business needs change. Business critical and/or sensitive workloads may be run on-premise resources, while meeting high service demands with cloud bursting. The architecture provides complete control to customize and make adjustments to IT infrastructure such as the use of edge computing to make it more efficient. The architecture may also provide easier adoption of $3^{rd}$ party solutions, providing rapid integration with $3^{rd}$ party SaaS providers without provisioning on-prem infrastructure. The hybrid architecture provides the ability to align cloud governance around data and compute to be aligned with the broader goals of the business by providing a simple and centralized data governance structure that allows enhanced data privacy, retention and security in adherence with procedures & policies prescribed by a business and compliance requirements.

The data registry may store metadata for shipment and registration of data in cloud and consumer mapping at various stores. The data registry may be replicated across internal data centers and cloud infrastructure. The registry may store policies and governance for third party integration, data shipment, data sharing and data life cycle management to ensure consistent application across the hybrid computing architecture. The access and entitlements to functionality may be based on AD (active directory) authentication/authorization although additional techniques such as two factor authentication may be used. The registry may provide entitlement policies for authorized access and shipment of data to/from the cloud. Security policies may be defined and stored in the registry for encryption/decryption/masking/redaction of data on premise and in cloud. The data encryption/decryption may be done by leveraging enterprise approved encryption solution across on-prem, cloud and third party (across multiple levels such as field, row, payload), while performing key management, and rotation policies on premise and in cloud.

The data access can provide data controls to ensure timely, accurate and complete data transfer. The data access may also provide data scanning and inspection to avoid operational errors around sharing sensitive data as well as monitoring of configurations and security settings. The data shipment may use shipment rules that are defined using predefined shipment templates. The shipment pipeline ships data across on-premise and cloud stores using both batch and streaming patterns. The data shipment may include approval workflows to guarantee movement of data in and/or out of the business is approved by the data custodians/stewards and any other relevant stake holders.

The hybrid data compute architecture uses containerized & standardized workloads which are portable across internal data centers and public cloud-based resources. A centralized on-premise orchestration process is used to trigger jobs on the compute fabric, which may be executed on either on-premise resources or cloud based resources.

Centralized on premise orchestration to trigger jobs on Compute Fabric, which may be on internal resources or provided by one or more cloud providers using, for example AKS (Azure Kubernetes Services), Amazon EKS (Elastic Kubernetes Service), or GKE (Google Kubernetes Engine).

A smart container router can be used to execute workloads cost effectively and in compliance with business and regulatory SLAs. The architecture provides the capability to dynamically scale compute based on market conditions and business drivers and provide support confidential computing for sensitive data.

Data consumption may be provided by a containerized data access platform, such as Dremio™, deployment instance that can be deployed to query data on-prem and across the cloud store. The consumption and decryption of sensitive data may be driven based on authorization and security policies defined and stored in the data registry. The data consumption may provide a consumption pattern to query and join datasets across cloud and on premise resources.

A data visualization UI can provide a seamless view across on premise data store and cloud. The architecture may capture operational metrics around shipment and compute in cloud integrated with data watch functionality. The data watch may integrate application logging generated in cloud. The architecture can provide complete data lineage view across on prem and cloud and view on consumers of data. The data may be used for audit and compliance. Disaster recovery capabilities may be built out by enabling clusters across regions on premise and the cloud. The data shipment, compute and access in cloud may be configured to conform to regulatory policies and guidelines.

Figure 6:
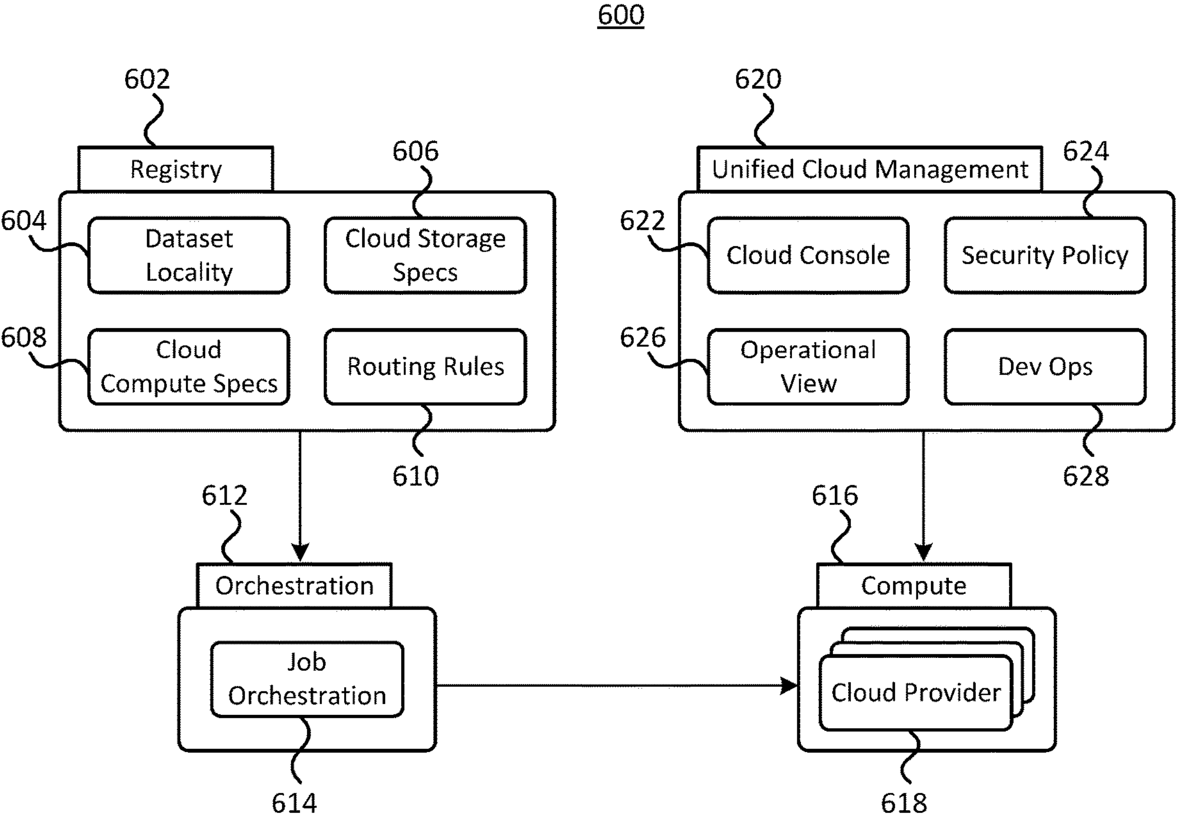
FIG. 6 depicts further details of the hybrid data compute plane.

FIG. 6 depicts further details of the hybrid data compute plane. The hybrid data compute plate 600 includes a registry 602 similar to that described above. The registry 602 may include information about data set locality 604, cloud storage specifications 606, cloud compute specifications 608 and routing rules 610. The registry 602 information may be used by orchestration functionality 612 that may provide job orchestrator for providing jobs to the compute resources 616, including cloud-based compute resources 618, which may be provided by different providers.

A unified cloud management component 620 can provide a view into the data across on premise and cloud-based storage as well as compute jobs on both on-prem and cloud-based resources. The unified cloud management may include a cloud console functionality 622, security policy functionality 624, operational view functionality 626, and DevOps functionality 628. The unified cloud management component 620 can provide a user interface for overseeing operation of the data and compute resources.

Figure 7:
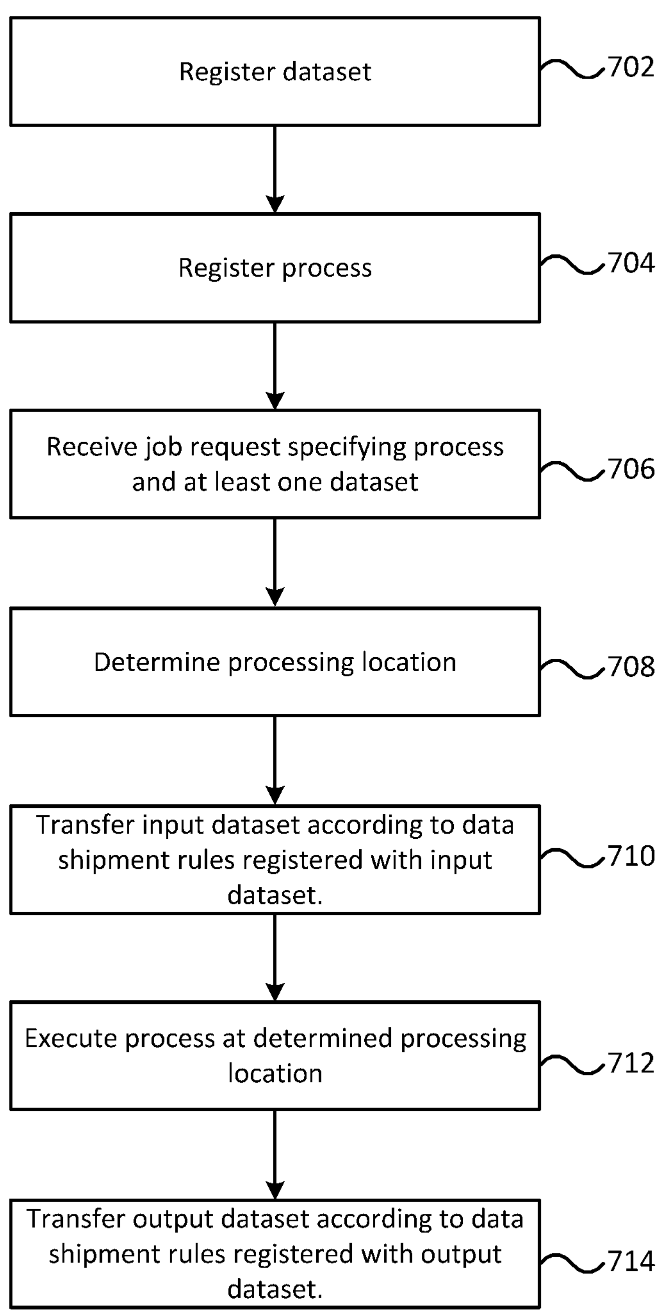
FIG. 7 depicts a process of processing a job.

FIG. 7 depicts a process of processing a job. The method 700 registers a dataset (702). The dataset may comprise a schema defining the dataset and may be associated with one or more data shipment rules that specify how the dataset should be handled for shipment and storage at different locations. A process is also be registered (704) with one or more associated processing rules that specify processing rules or requirements. A job request is received that specifies a process and one or more input and/or output datasets (706). The process and datasets in the job request should have already been registered with the system; however, if they have not yet been registered, a registration process for the process and/or datasets that aren't registered can be performed. The processing location for the process is determined (708), which may be based on various factors such as processing requirements, security requirements, cost, etc. If the process uses an input dataset, the dataset is transferred to the determined processing location (710). It will be apparent that if the process does not require an input dataset, the dataset does not need to be transferred. With the input dataset available, if required by the process, the process is executed at the determined processing location (712). The location may be on-premise or in the cloud and may include more specific locals, regions or zones. If the process generates an output dataset, it may be transferred from the determined data shipment rules that were registered with the dataset (714).

The processor used in the foregoing embodiments may comprise, for example, a processing unit (such as a processor, microprocessor, or programmable logic controller) or a microcontroller (which comprises both a processing unit and a non-transitory computer readable medium). Examples of computer readable media that are non-transitory include disc-based media such as CD-ROMs and DVDs, magnetic media such as hard drives and other forms of magnetic disk storage, semiconductor based media such as flash media, random access memory (including DRAM and SRAM), and read only memory. As an alternative to an implementation that relies on processor-executed computer program code, a hardware-based implementation may be used. For example, an application-specific integrated circuit (ASIC), field programmable gate array (FPGA), system-on-a-chip (SoC), or other suitable type of hardware implementation may be used as an alternative to or to supplement an implementation that relies primarily on a processor executing computer program code stored on a computer medium.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

What is claimed is:

1. A method of executing a process comprising:

registering a dataset schema with a data shipment registry, registering the dataset schema including associating one or more data shipment rules with the dataset schema;

registering the process with the data shipment registry including associating one or more processing rules with the process;

receiving a job request for the process specifying at least one dataset and retrieving the processing rules associated with the process and data shipment rules registered in association with the at least one dataset;

determining an execution location of the process based on the retrieved processing rules and the data shipment rules, the determined execution location selected from an on-premise processing location and a cloud-based processing location;

transferring, according to the data shipment rules, at least one of:

an input dataset to the determined execution location; and an output dataset from the determined execution location;

executing the process at the determined execution location including at least one of:

when transferring according to the data shipment rules comprises transferring the input dataset to the determined execution location, using the input dataset transferred to the determined execution location; and when transferring according to the data shipment rules comprises transferring the output dataset from the determined execution location, generating the output dataset prior to transferring the output dataset from the determined execution location;

wherein data shipment rules associated with the at least one of the input dataset and the output dataset specify requirements for modifying personally identifiable information (PII).

2. The method of claim 1, wherein the processing location is further determined based on one or more of:

desired performance requirements of the process;

resource constraints of the on-premise location; and costs associated with executing the process at the cloud-based location.

3. The method of claim 1, wherein the data shipment rules specify one or more of:

allowed storage locations of the associated dataset;

encryption requirements for transferring the dataset; and encryption of one or more portions of the dataset.

4. The method of claim 1, wherein transferring the at least one of the input dataset and the output dataset of the process comprises bulk transferring or streaming the at least one of the input dataset and the output dataset.

5. The method of claim 1, wherein transferring the at least one of the input dataset and the output dataset further comprises modifying the PII in the at least one of the input dataset and the output dataset.

6. The method of claim 5, wherein modifying the PII comprises one or more of:

removing the PII from the at least one of the input dataset and the output dataset;

replacing the PII in the at least one of the input dataset and the output dataset with non-identifiable information; and encrypting the PII in the at least one of the input dataset and the output dataset.

7. The method of claim 1, wherein the data shipment rules define data security policies for the associated dataset.

8. The method of claim 1, wherein transferring the at least one of the input dataset and the output dataset comprises sending a notification of the transfer to an operational store for tracking locations of datasets.

9. A system for executing a process, the system comprises:

at least one processor for executing instructions; and at least one memory storing instructions, which when executed by the at least one processor configures the system to perform a method comprising:

registering a dataset schema with a data shipment registry, registering the dataset schema including associating one or more data shipment rules with the dataset schema;

registering the process with the data shipment registry including associating one or more processing rules with the process;

receiving a job request for the process specifying at least one dataset and retrieving the processing rules associated with the process and data shipment rules registered in association with the at least one dataset;

determining an execution location of the process based on the retrieved processing rules and the data shipment rules, the determined execution location selected from an on-premise processing location and a cloud-based processing location;

transferring, according to the data shipment rules, at least one of:

an input dataset to the determined execution location; and an output dataset from the determined execution location;

executing the process at the determined execution location including at least one of:

when transferring according to the data shipment rules comprises transferring the input dataset to the determined execution location, using the input dataset transferred to the determined execution location; and when transferring according to the data shipment rules comprises transferring the output dataset from the determined execution location, generating the output dataset prior to transferring the output dataset from the determined execution location, wherein the data shipment rules comprise one or more rules for scanning the dataset for personally identifiable information (PII), wherein transferring the at least one of the input dataset and the output dataset comprises scanning the dataset for the PII, and wherein data shipment rules associated with the at least one of the input dataset and the output dataset specify requirements for modifying PII.

10. The system of claim 9, wherein the processing location is further determined based on one or more of:

desired performance requirements of the process;

resource constraints of the on-premise location; and costs associated with executing the process at the cloud-based location.

11. The system of claim 9, wherein the data shipment rules specify one or more of:

allowed storage locations of the associated dataset;

encryption requirements for transferring the dataset; and encryption of one or more portions of the dataset.

12. The system of claim 9, wherein transferring the at least one of the input dataset and the output dataset of the process comprises bulk transferring or streaming the at least one of the input dataset and the output dataset.

13. The system of claim 9, wherein transferring the at least one of the input dataset and the output dataset further comprises modifying the PII in the at least one of the input dataset and the output dataset.

14. The system of claim 13, wherein modifying the PII comprises one or more of:

removing the PII from the at least one of the input dataset and the output dataset;

replacing the PII in the at least one of the input dataset and the output dataset with non-identifiable information; and encrypting the PII in the at least one of the input dataset and the output dataset.

15. The system of claim 9, wherein the data shipment rules define data security policies for the associated dataset.

16. The system of claim 9, wherein transferring the at least one of the input dataset and the output dataset comprises sending a notification of the transfer to an operational store for tracking locations of datasets.

17. A non-transitory computer readable memory storing instructions, which when executed by at least one processor of a system configures the system to perform a method according to claim 1.

* * * * *